United States Patent Office 3,354,167
Patented Nov. 21, 1967

3,354,167
PYRAZOLONE DERIVATIVES AND PROCESS FOR THEIR PREPARATION
Josef Klosa, Berlin, Germany, assignor to Delmar Chemicals Limited, Montreal, Quebec, Canada, a corporation of Canada
No Drawing. Filed June 21, 1965, Ser. No. 465,740
Claims priority, application Germany, June 23, 1964, K 53,283
5 Claims. (Cl. 260—295)

ABSTRACT OF THE DISCLOSURE

New pyridiniumacylamidopyrazolones of the formula:

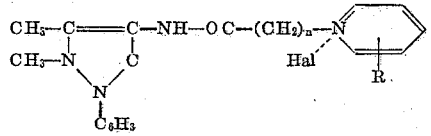

wherein
Hal is chlorine, bromine or iodine
R is carbamoyl, formyl or bromine and
$n$ is 1 or 2 are prepared by reacting a halogenoacetamidopyrazolone of the formula:

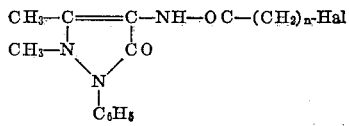

wherein Hal and $n$ are as defined above with a pyridine derivative of the formula:

wherein R is as defined above. The products of the invention have low toxicity and have good analgesic, antipyretic and anti-inflammatory activity.

---

This invention has as its objective the preparation of a new class of pyridiniumacylamidopyrazolone derivatives of the following general formula:

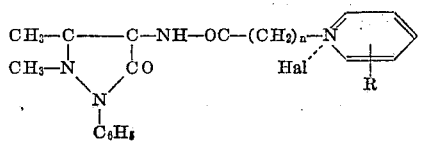

in which Hal represents a halogen selected from the group consisting of chlorine, bromine, or iodine; R represents a member selected from the group consisting of carbamoyl, formyl and bromine and $n$ represents an integer from 1 to 2 inclusive. They are novel quaternary pyridinium salts.

I found that this new class of compounds can be prepared by reacting a suitable halogenacetamidopyrazolone of the general Formula A

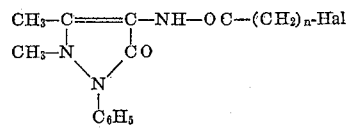

with an unsubstituted or substituted pyridine derivative of the Formula B

in which R, $n$ and Hal have the same meaning as explained before.

The reaction between suitable compounds of Fomulae A and B may take place even with a short heating of this mixture over the melting point of the mix at 100–150° C. The melt solidifies on cooling. Purification is carried out by using standard methods known in the art, like washing with a suitable solvent, crystallization, etc. For example, the melt may be purified through boiling up with a suitable solvent like isopropanol. The purification of the resulting quaternary pyridinium salt may be carried out also by dissolving it in a lower alcohol and precipitating it with ether, benzene, toluene or other similar organic solvents. The reaction itself may be carried out in the presence or in the absence of a solvent. Suitable solvents include alcohols, benzene, toluene or a mixture of such solvents.

I found that these new quaternary pyridinium-salts are characterized by their high solubility in water. These solutions are stable and remain so after prolonged heating. It was unexpected that ω-halogenoacylamides of the 1-phenyl-2,3-dimethylpyrazolone-(4) which are not well soluble, will yield after a reaction with pyridine- or its derivatives-compounds with such desirable physical characteristics, well suited for therapeutical applications.

Pyridine-derivatives of Formula B, suitable for this reaction include: pyridine, $\alpha$, $\beta$ or $\gamma$-picoline, nicotinic acid, nicotine-amide, nicotinic diethylamide and other similar amides, pyridine-2-, -3-, or -4-aldehyde, $\beta$-hydroxypyridine, $\beta$-aminopyridine or their N-substituted derivatives, $\alpha$-, $\beta$- or $\gamma$-chloropyridine, $\alpha$-, $\beta$- or $\gamma$-bromopyridine, etc.

Suitable 4-halogenoacylamido-1-phenyl-2,3-dimethyl-5-pyrazolones of the general formula A include, for instance, 4-chloroacetamido-1-phenyl-2,3-dimethyl - 5 - pyrazolones, 4-bromoacetamido-1-phenyl - 2,3 - dimethyl-5-pyrazolone, 4 - ($\beta$-bromopropionamido)-1-phenyl-2,3-dimethyl-5-pyrazolone, 4 - ($\gamma$-bromobutyramido)-1-phenyl-2,3-dimethyl-5-pyrazolone.

It was found that the compounds of this group are characterized by low toxicity and have good analgesic, antipyretic and anti-inflammatory activity, making them eminently suitable for use as drugs in human and veterinary applications.

The following table illustrates the superiority of representative compounds of this group in comparison with the known 4-dimethylamino - 1 - phenyl-2,3-dimethyl-pyrazolone (called Dipyrin for short).

The determination of the $LD_{50}$ was carried out according to Kaerber.

In the determination of the analgesic activity the method of Eddy (J. of Pharmacol. & Exp. Ther., Vol. 98 (1959) p. 121) a modified hot-plate method was used. The increase in the time of the reaction of the animals was used, measured in percentages. Then animals were used per experiment.

The following compounds were tested:

4-pyridiniumacetamido - 1 - phenyl - 2,3 - dimethyl - 5-pyrazolone chloride=Compound I.
4-(3-carbamoylpyridiniumacetamido) - 1 - phenyl - 2,3-dimethyl - 5 - pyrazolone-chloride=Compound II.

TABLE

| Compound | $LD_{50}$ in mg./kg., mouse | | Analgesic Activity | | |
|---|---|---|---|---|---|
| | S.C. | I.V. | Dose in mg./kg. | Increase in percent after— | |
| | | | | 30 minutes | 60 minutes |
| Dipyrin | 265 | 143 | 50 | 18 | 12 |
| | | | 100 | 42 | 10 |
| Comp. I | 3,350 | 380 | 50 | 16 | 8 |
| | | | 100 | 26 | 10 |
| Comp. II | 4,370 | 485 | 50 | 20 | 10 |
| | | | 100 | 38 | 8 |

While the toxicity is appreciably lowered, the analgesic activity of Compounds I and II is almost equal to Dipyrin.

Antipyretic activity was investigated on guinea pigs of both sexes by the Pyrifer (Coli-Brazilli) method.

Compounds I and II, in a dose of 300 mg./kg. have the same activity as 150 mg. Dipyrin. Even though the antipyretic activity of I and II is lower, the therapeutic index is higher.

As to anti-inflammatory activity, Compounds I and II, at the dosage level of 200 mg./kg. proved to be equal to Dipyrin in activity against albumin-edema.

The preparation of these new compounds may be illustrated with the following examples:

*Example 1*

5.2 g. 4-chloroacetamido - 1 - phenyl - 2,3 - dimethyl-5-pyrazolone were mixed with 2 ml. pyridine (slight excess) and slowly heated to 100–120° while keeping the mixture stirred. Within a few minutes a clear melt resulted which then solidified to a pale yellow crystalline mass. The heating was stopped. After cooling the mass was dissolved in a little hot methanol, then 8–10 ml. isopropanol were added and 6 g. crystalline 4-pyridiniumacetamido - 1 - phenyl - 2,3 - dimethyl-5-pyrazolone chloride were obtained. M.P. 248–250° C. (dec.).

*Example 2*

5.3 g. 4-chloroacetamido - 1 - phenyl - 2,3 - dimethyl-5-pyrazolone were mixed with 2.5 g. nicotinamide. The mixture was heated to 100° C. It formed a clear yellow melt. The temperature rose rapidly to 120–130° C. The heating was stopped. The whole reaction took only a few minutes. A hard brownish-yellow mass resulted. This was boiled up with isopropanol. The resulting crystals were dissolved in a little cold water, the solution was decolorized with charcoal and the product precipitated as nice yellow crystals with 10 parts of isopropanol.

Yield, 94% of 4-(3-carbamoylpyridiniumacetamido)-1-phenyl-2,3-dimethyl-5-pyrazolone - chloride. M.P. 283–285° C. (dec.). Darkens from 275° up.

*Example 3*

5.2 g. 4-chloroacetamido - 1 - phenyl - 2,3-dimethyl-5-pyrazolone were dissolved in 20 ml. hot isopropanol.

A hot solution of 2.5 g. nicotinamide in 15 ml. isopropanol was added and the mixture refluxed for 2–3 hours. Already during the refluxing the product began to precipitate. After cooling, to complete the crystallization, 30 ml. benzol or toluol were added. The purification of the product was carried out as in Example 2.

In a similar manner the following products were obtained:

4-pyridiniumpropionamido - 1 - phenyl - 2,3-dimethyl-5-pyrazolone bromide, M.P. 246° C. (dec.) (from 4-(β-bromopropionamido) - 1 - phenyl - 2,3 - dimethyl-5-pyrazolone and pyridine).

4 - (3 - carbamoylpyridiniumpropionamido) - 1 - phenyl-2,3-dimethyl-5-pyrazolone bromide, M.P. 290–2° C. dec.) (from 4-(β-bromopropionamido) - 1 - phenyl-2,3-dimethyl - 5 - pyrazolone and nicotinamide).

4 - (2 - methylpyridiniumacetamido) - 1 - phenyl - 2,3-dimethyl-5-pyrazolone chloride, M.P. 194–6° C. (dec.) (from 4-chloroacetamido - 1 - phenyl - 2,3 - dimethyl - 5 - pyrazolone and α-picoline).

4 - (2 - bromopyridiniumacetamido) - 1 - phenyl - 2,3-dimethyl - 5 - pyrazolone chloride, M.P. 260° C. (dec.) (from 4 - chloroacetamido - 1 - phenyl - 2,3-dimethyl-5 - pyrazolone and 2-bromopyridine).

4 - (3 - formylpyridiniumacetamido) - 1 - phenyl - 2,3-dimethyl-5-pyrazolone chloride, M.P. 245° C. (dec.) (from 4 - chloroacetamido - 1 - phenyl - 2,3 - dimethyl-5-pyrazolone and nicotinaldehyde).

I claim:

1. A compound selected from the group consisting of pyridiniumacylamidopyrazolone derivatives of the formula:

$$CH_3-C=C-NH-OC-(CH_2)_n-N \begin{array}{c} \\ \\ \end{array}$$
$$CH_3-N \quad C=O \quad Hal^- \quad R$$
$$N$$
$$C_6H_5$$

wherein Hal represents a halogen selected from the group consisting of chlorine, bromine and iodine, R represents a member selected from the group consisting of carbamoyl, formyl or bromine and n is an integer from 1 to 2 inclusive.

2. 4-(3-carbamoylpyridiniumacetamido) - 1 - phenyl-2,3-dimethyl-5-pyrazolone chloride, having the structural formula:

[structural formula]

3. 4-(3-carbamoylpyradiniumpropionamido) - 1 - phenyl-2,3-dimethyl-5-pyrazolone bromide, having the structural formula:

[structural formula]

4. 4-(2-bromopyridiniumacetamido) - 1 - phenyl-2,3-dimethyl-5-pyrazolone chloride, having the structural formula:

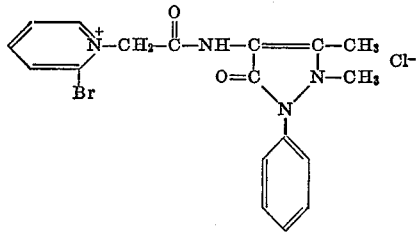

5. 4-(3-formylpyridiniumacetamido) - 1 - phenyl-2,3-dimethyl-5-pyrazolone chloride, having the structural formula:

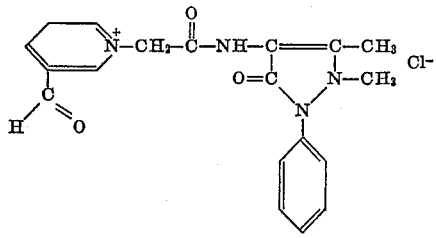

References Cited

FOREIGN PATENTS

| 497,485 | 12/1938 | Great Britain | 260—295 |
| 855,165 | 11/1960 | Great Britain | 260—295 |
| 939,201 | 10/1963 | Great Britain | 260—295 |

JOHN D. RANDOLPH, *Primary Examiner.*

WALTER A. MODANCE, *Examiner.*

A. ROTMAN, *Assistant Examiner.*